July 24, 1956 F. J. SCHENKELBERGER 2,755,949
LOAD HANDLING EQUIPMENT FOR INDUSTRIAL TRUCKS
Filed Jan. 14, 1952 10 Sheets-Sheet 1

INVENTOR.
FRANK J. SCHENKELBERGER
BY
Geo. B. Pitts
ATTORNEY

July 24, 1956 F. J. SCHENKELBERGER 2,755,949
LOAD HANDLING EQUIPMENT FOR INDUSTRIAL TRUCKS
Filed Jan. 14, 1952 10 Sheets-Sheet 2
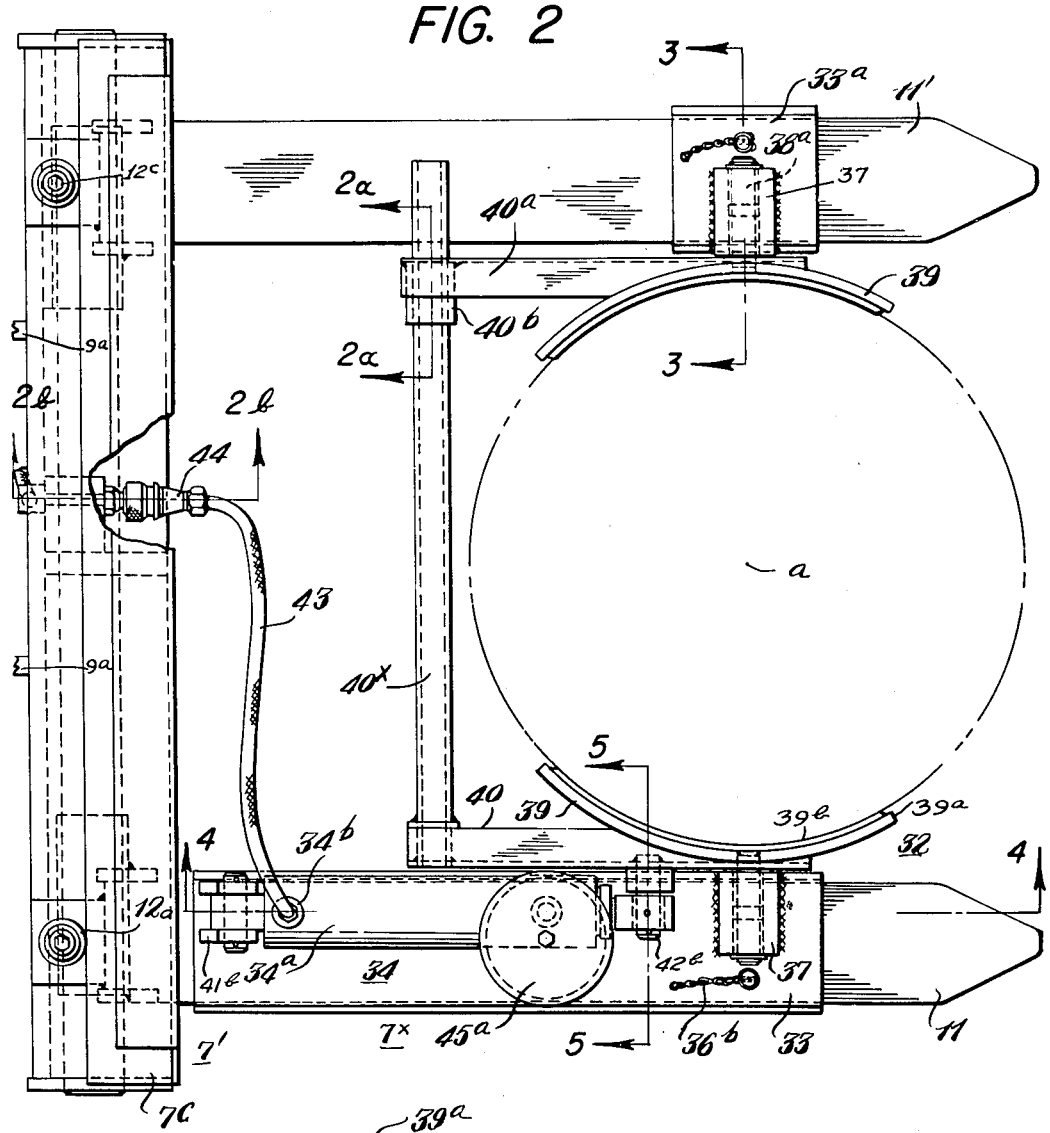
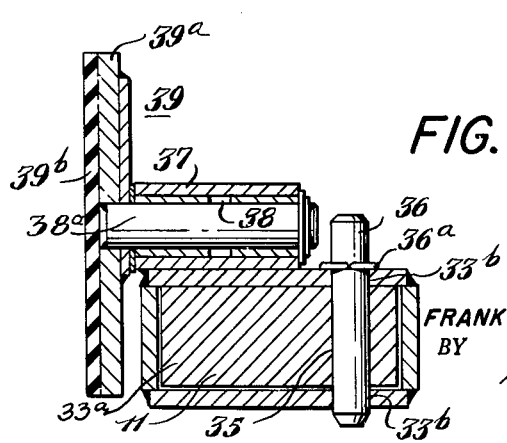
INVENTOR.
FRANK J. SCHENKELBERGER
BY
Geo. B. Pitts
ATTORNEY

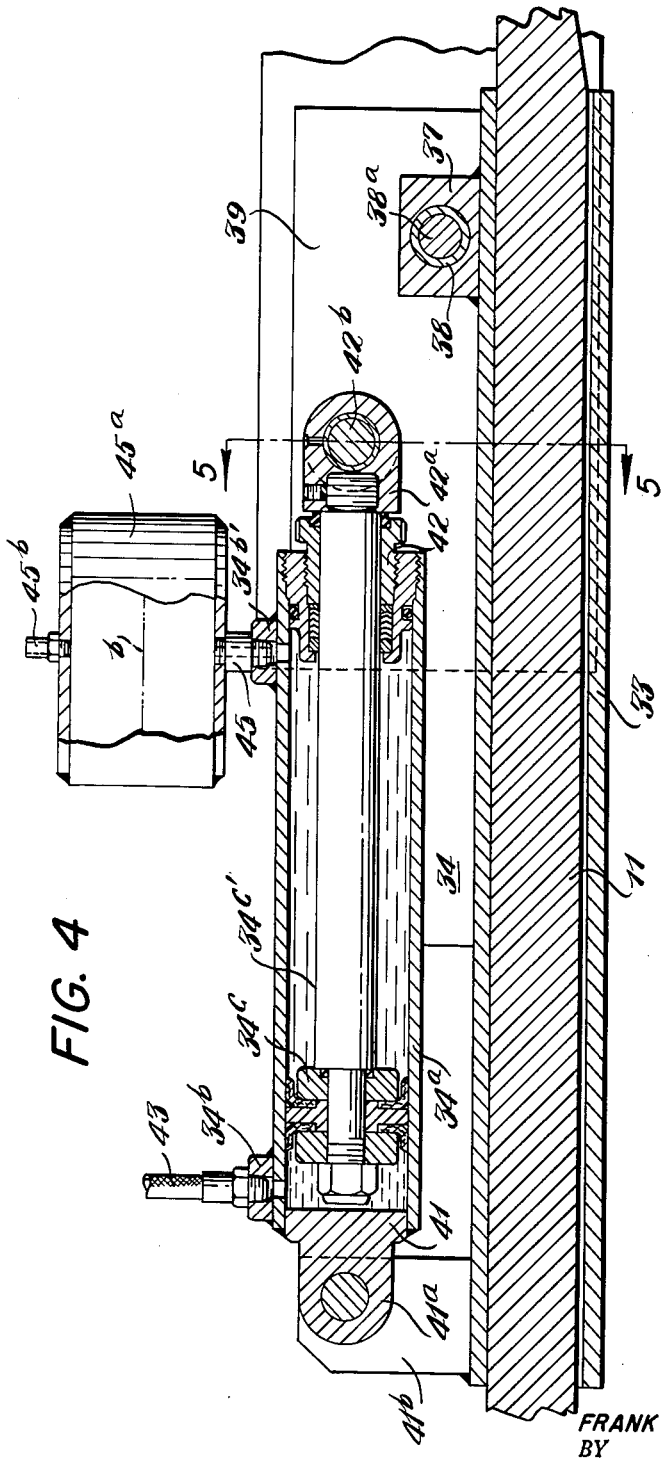

INVENTOR.
FRANK J. SCHENKELBERGER
BY
Geo. B. Pitts
ATTORNEY

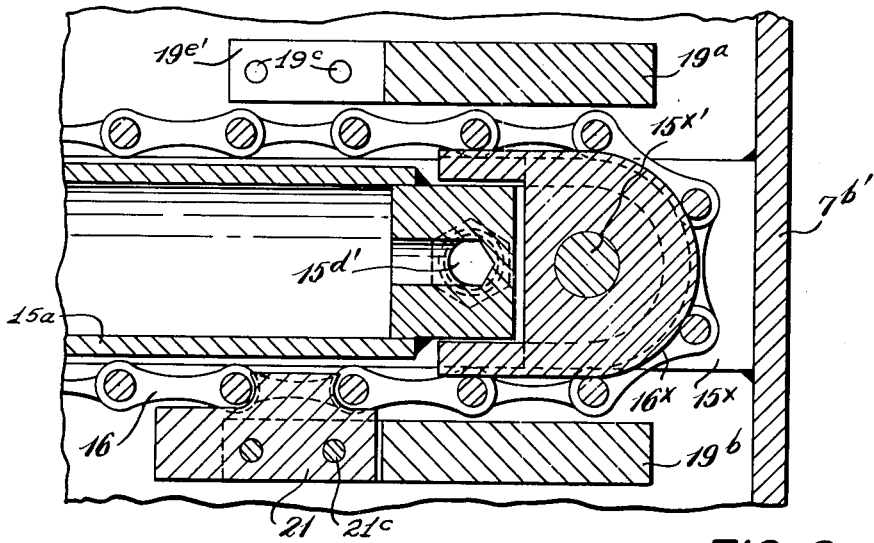
FIG. 8
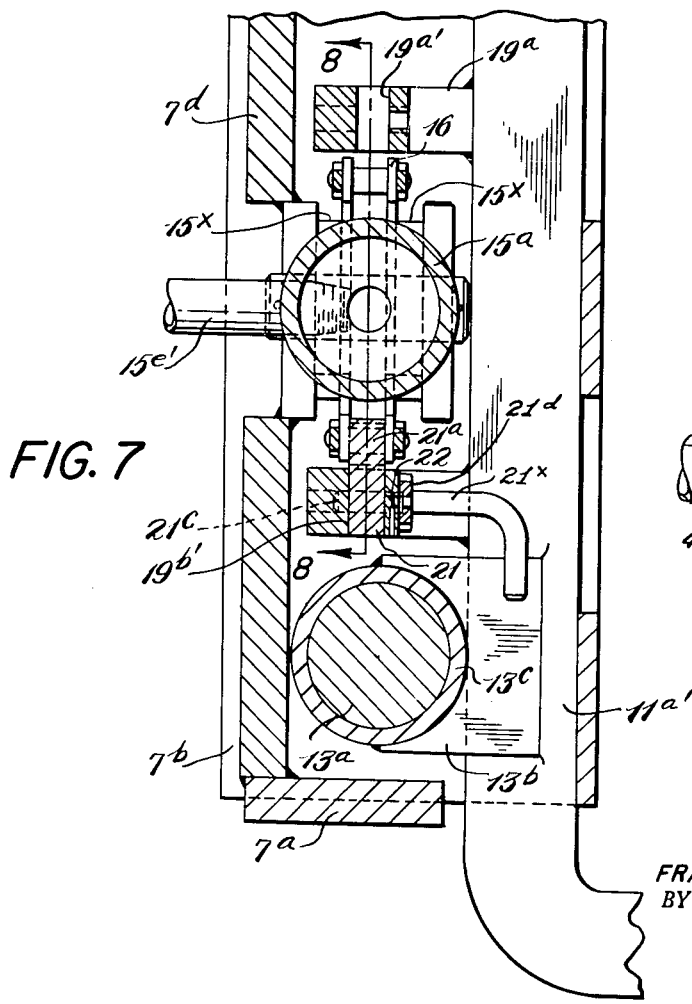
FIG. 7
FIG. 2a
INVENTOR.
FRANK J. SCHENKELBERGER
BY
Geo. B. Ortle
ATTORNEY July 24, 1956  F. J. SCHENKELBERGER  2,755,949
LOAD HANDLING EQUIPMENT FOR INDUSTRIAL TRUCKS
Filed Jan. 14, 1952  10 Sheets-Sheet 6

INVENTOR.
FRANK J. SCHENKELBERGER
BY
Geo. B. Little
ATTORNEY

July 24, 1956    F. J. SCHENKELBERGER    2,755,949
LOAD HANDLING EQUIPMENT FOR INDUSTRIAL TRUCKS
Filed Jan. 14, 1952    10 Sheets-Sheet 7

INVENTOR.
FRANK J. SCHENKELBERGER
BY
Geo. B. Titus
ATTORNEY

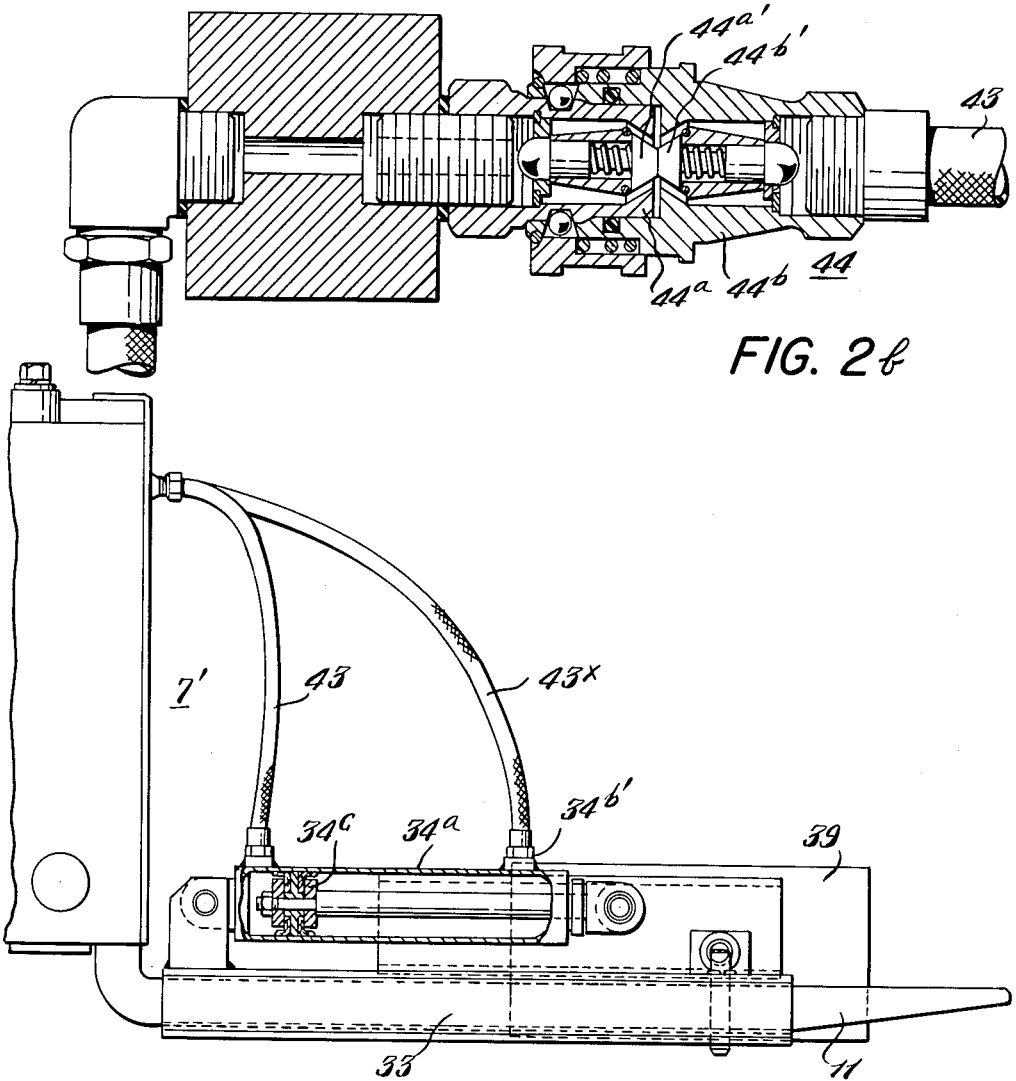

July 24, 1956  F. J. SCHENKELBERGER  2,755,949
LOAD HANDLING EQUIPMENT FOR INDUSTRIAL TRUCKS
Filed Jan. 14, 1952  10 Sheets-Sheet 9

INVENTOR.
FRANK J. SCHENKELBERGER
BY
Geo. B. Pitts
ATTORNEY

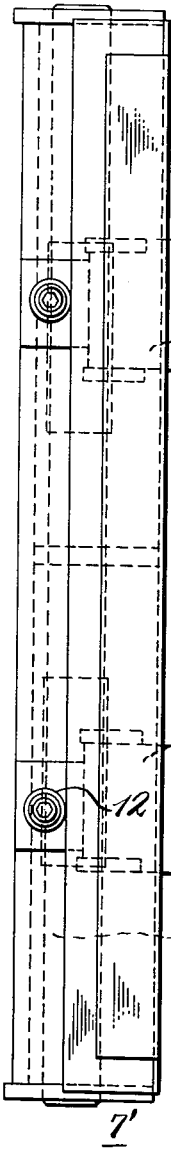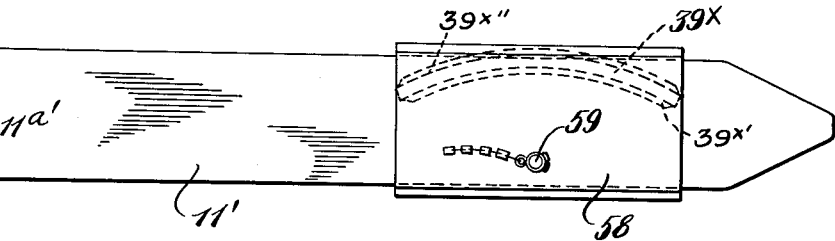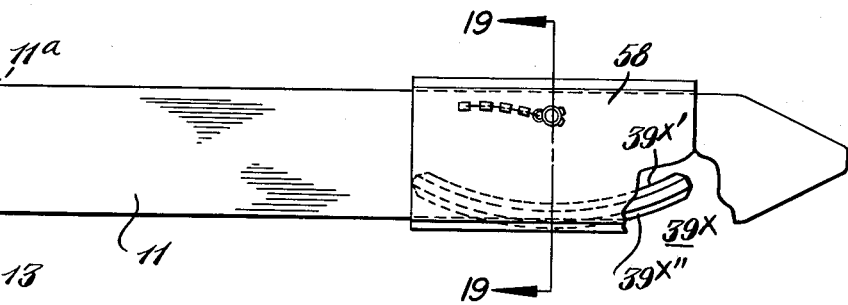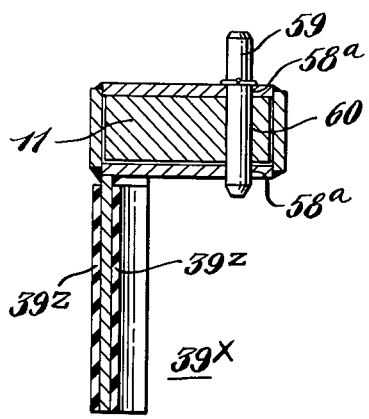

United States Patent Office 2,755,949
Patented July 24, 1956

2,755,949

LOAD HANDLING EQUIPMENT FOR
INDUSTRIAL TRUCKS

Frank J. Schenkelberger, North Olmsted, Ohio, assignor, by mesne assignments, to The Baker-Raulang Company, a corporation of Delaware Application January 14, 1952, Serial No. 266,288

13 Claims. (Cl. 214—652)

This invention relates to an industrial truck of the lift type, more particularly to equipment for handling different forms of loads. The equipment is mounted on a support (hereinafter referred to as an elevating member), which is movably mounted on guides, whereby it may be raised by suitable mechanism. The equipment may be incorporated with the support as a permanent assembly therewith, but, by preference, the support is provided with a load carrier and the engaging means are attachable to and detachable from the load carrier; in this latter arrangement the load carrier and the load engaging means form the handling equipment and since the load carrier may be detachably mounted on the support, it may be replaced by a different form of carrier, so that the truck of this type may be used to carry out various operations.

One object of the invention is to provide an improved load handling equipment, whereby a load may be readily engaged, elevated for transportation and discharged.

Another object of the invention is to provide an improved load handling equipment capable of picking up filled containers and the latter manipulated into dumping position to discharge its contents.

Another object of the invention is to provide, in a lift type of truck, improved means for engaging, elevating, transporting and discharging a load consisting of a raisable load carrier having relatively movable members and load engaging devices thereon for engaging and releasing a load.

Another object of the invention is to provide an improved load engaging means adapted to be removably mounted on the load carrier of a truck.

Another object of the invention is to provide in a truck having an elevatable support, an improved load handling mechanism consisting of a pair of members mounted on the support for relative movement toward and from each other and provided with load engaging devices, whereby loads may be engaged, raised and transported and discharged.

Another object of the invention is to provide in a truck having an elevatable support, an improved load handling mechanism consisting of a pair of members mounted on the support for relative movement toward and from each other and provided with fulcrumed load engaging devices, whereby loads may be engaged and raised and operated into various positions while supported on said members, for inspection, treatment, and containers filled and the contents thereof discharged.

Other objects of the invention will be apparent to those skilled in the art to which my invention relates from the following description taken in connection with the accompanying drawings, wherein Fig. 1 is a fragmentary side elevation of an industrial truck provided with a load handling equipment embodying my invention;

Fig. 2 is a plan view of parts shown in Fig. 1, enlarged, taken on the line 2—2 of Fig. 1;

Figs. 2a, 2b (enlarged), 3 and 4 are sections on the lines 2a—2a, 2b—2b, 3—3 and 4—4, respectively, of Fig. 2;

Fig. 7 is a section on the line 7—7 of Fig. 6;

Fig. 7a is a fragmentary section on the line 7a—7a of Fig. 6;

Fig. 8 is a section on the line 8—8 of Fig. 7;

Fig. 13 is a side elevation showing a further modification, parts being broken away;

Fig. 18 is a plan view showing another modification; and

Fig. 19 is a section on the line 19—19 of Fig. 18.

Figure 5:
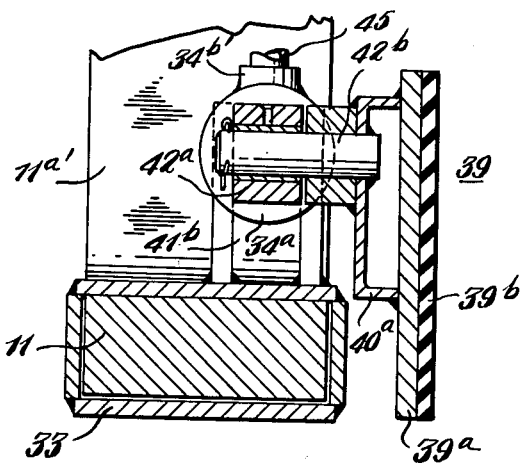
Fig. 5 is a section on the line 5—5 of Figs. 2 and 4.

In the drawings (referring specifically to Figs. 1 to 8, inclusive), 1 indicates as an entirety the front end portion of an industrial truck having a frame 1a mounted on a pair of front wheels 1b and a pair of rear wheels (not shown), one of said pairs of wheels being driven and the other pair being steerably mounted. The frame 1a supports a pair of outer guides 2, which are mounted on trunnions, whereby, by operation of a suitable power means indicated at 3, the guides 2 and parts supported thereon may be tilted outwardly and inwardly. The guides 2 slidably support a pair of inner guides 4, relative to which a device or elevating member, indicated at 5, is moved vertically by a fluid operated mechanism 6. The mechanism 6 is operable to raise the device 5 and a load carrier, indicated as an entirety at 7, (a) independently of the guides 2, 4, to and from the upper ends thereof and to and from selected positions below the upper ends of the guides—one such selected position being shown in Fig. 1 and (b) upon reaching the upper ends of the guides to raise both the inner guides 4 and device 5 to position the carrier 7 at selected higher levels. The construction of the truck frame, mounting of the wheels therefor, the vertically movable device 5, guides for the latter and the raising mechanism for the device 5 above referred to form no part of the present invention and may be of any desired construction and arrangement. The form of construction of the fluid operated mechanism 6 I believe to be the invention of Max Lehmann, of East Cleveland, Ohio, as disclosed in Letters Patent No. 2,598,566.

The carrier 7 comprises a frame 7' and a load support 7x which is later referred to. The frame 7' consists of a bottom wall 7a, side walls 7b, 7b', a top wall 7c and a rear wall 7d consisting of upper and lower spaced panels, these walls being suitably welded together. The frame 7' is reinforced by a vertically disposed bar 8 welded to the top and bottom walls thereof and horizontally disposed bars 8a, 8a, the opposite ends of which are welded to the vertical bar 8 and side walls 7b, 7b'. The frame 7' may be of any desired width. The rear wall 7d is provided with rearwardly extending, parallelly related brackets 9 provided with laterally extending, upper and lower shafts 9a supporting rollers 10 (see Fig. 1), which roll on and relative to the inner guides 4 as set forth in the aforesaid patent.

The load support 7x, as shown herein in Figs. 1 to 8, inclusive, consists of outwardly extending, parallel related members, such as tines or forks 11, 11', preferably integrally connected at their inner ends to upstanding legs 11a, 11a', respectively, and each mounted on the frame 7' for movement at right angles to the guides 2. The mounting for the members 11, 11', preferably comprises upper and lower guide devices 12, 13, respectively. The devices 13 consist of the following: 13a indicates a guide member disposed adjacent the lower end of the frame 7' and suitably mounted at its opposite ends in alined openings formed in the side bars 7b, 7b'. The upstanding leg of each load carrying member 11, 11', is provided at its opposite sides with rearwardly extending supports 13b which are connected an elongated sleeve 13c suit-fitting the guide member 13a, the sleeves on the legs 11a, 11a', being in axial alinement. Each of the guide devices 12 consists of a roller 12a mounted on one of the legs 11a, 11a', and having rolling engagement with the rear side of the top wall 7c. Each roller 12a rotates on a bushing 12b which is mounted on a bolt 12c, between a washer 12d and a plate 14, the latter forming part of a U-shaped bracket 14a. The bracket 14a is fixed to the adjacent leg at the upper end thereof and extends rearwardly therefrom. The bolt 12c extends through and has threaded engagement with the walls of an opening formed in the plate 14. As will be observed, the guide devices 12, 13, slidably support the load carrying members 11, 11', on the frame 7' in a manner which eliminates binding thereof when relatively moved or moved together as a unit, as later set forth.

The means for operating or adjusting the load carrying members 11, 11', on the guide devices 12, 13, comprises a power mechanism 15 and a movable device 16, the device 16 having separate connections with the load carrying members 11, 11', one of said connections being selective, whereby the members may be moved by the device 16, one relatively to the other, or both moved on the guides together as a unit, as later set forth. The power mechanism 15 preferably consists of a cylinder-piston disposed horizontally, the outer end wall of the cylinder 15a being provided with an extension supported between the inner end portions of a pair of spaced plates 15x, the outer ends of which are suitably secured to the side bar 7b', above and spaced from the guide member 13a. The cylinder 15a is provided with a reciprocable piston 15b, which is connected to the inner end of a rod 15c. The outer end of the rod is pivotally connected to the inner end portion of a block 15d, the outer end portion of the latter being connected to the leg 11a of the adjacent load carrying member 11 remote from the side wall 7b'. The opposite end portions of the cylinder 15a are provided with fluid connections 15d, 15d', to which are connected fluid flow pipes 15e, 15e', respectively, leading to a suitable valve mechanism (not shown), which in turn is mounted on the truck frame 1a and controlled by a lever 15'. The fluid (such as oil) is supplied under pressure in a well known manner to either pipe 15e, 15e'. By operation of the lever 15' in one direction, the oil under pressure flows through one pipe for supply to the adjacent end of the cylinder 15a to move the piston 15b toward the opposite end thereof, the oil in the cylinder being discharged through the other pipe to and through the valve mechanism to a sump (not shown); operation of the lever 15' in the opposite direction reverses the fluid connections to the cylinder 15a to move the piston 15b in the opposite direction. By preference, the fluid equipment, including the sump, pump, motor for driving the pump and valve mechanism, is of a well known form of construction and is mounted on the truck frame 1a, for which reason these parts of the equipment are not shown. Those portions of the pipes 15e, 15e', leading from the fluid connections 15d, 15d', respectively, consist of flexible hoses to accommodate the movement of the carrier upwardly and downwardly relative to the guides 2, 4, and frame 1a. These flexible pipe portions may be suitably mounted on parts of the raising mechanism in any preferred manner. The movable device 16 consists of an endless flexible member, preferably a chain, to which the legs 11a, 11a', are connected, as later set forth. The chain 16 reeves about element 16a, 16b, the element 16a being disposed between the plates 15x and secured thereto by a pin 15x' extending through alined openings formed in the plates 15x and element 16a. The element 16b is adjustably mounted on the panels forming the rear wall 7d to take up slack in the flexible member 16 in the following manner: 16c indicates a base block fitting into the space between the rear wall panels and suitably welded thereto. The inner face of the block 16c and opposed side edges of the adjacent panels provide a guide for a slide 16d. The slide 16d is formed with an opening in which is suitably fixed a pin 16e the outer end of which extends through an opening formed in the adjacent reeving element 16b. The slide 16d is fixed in adjusted position by a cap screw 17 extending through an opening 16c' formed in the block 16c and threaded into an opening formed in the slide 16d, the opening 16c' being elongated on an axis which intersects the axis of the path traversed by the flexible member on the reeving element 16b. The slide 16d is adjusted outwardly endwise of its guide by a screw 17a threaded through the inner side of the block 16c in line with and at right angles to the clamping screw 17 and adapted to engage the latter. In this arrangement, upon loosening the screw 17 and operation of the screw 17a to move it endwise inwardly, the slide 16d may be adjusted to take up slack in the flexible member 16, following which operation the screw 17 is tightened to secure the slide 16d in adjusted position.

The respective reeving elements 16a, 16b, may consist of sprockets, where the member 16 consists of a chain, but where a flexible member 16 of a different type is used, rollers or pulleys may be employed as reeving elements. In the use of sprockets or rollers, the pins 15x', 16e, serve as shafts therefor. I prefer to use an endless chain and to employ stationary reeving elements, as shown, each having a semi-circular outer end wall 16x (see Fig. 8), on which the cross or end bars of the links ride during movement of the chain, the side plates of the chain links having an overlapping relation to the opposite faces of the elements 16a, 16b, as shown, whereby the chain is movably supported on these elements. Preferably the cross or end bars of the chain links are provided with rollers which roll on the semi-circular end walls of the reeving elements 16a, 16b. By preference, the reeving elements 16a, 16b, are so mounted, as above set forth, that the axes of the walls 16x, about which the chain 16 reeves, are in alinement with the axis of the cylinder 15a. In this arrangement, the upper and lower runs of the chain 16 are equally spaced from and at opposite sides of the axis of the cylinder 15a and parallel to the direction of movement of the piston rod 15c.

In the form of construction shown I provide a connection 18 between the leg 11a of the load carrying member 11 and the chain 16 and a selective connection 19 between the leg 11a' of the load carrying member 11' and the chain 16. In such arrangement, when the piston 15b is operated in either direction, the load carrying member 11 is moved or adjusted on the guides 12, 13, and through the chain 16 the member 11 moves the load carrying member 11' in a direction, as determined by the selective connection 19. The connection 18 consists of a plate 18a suitably fixed to the inner side of the leg 11a for the member 11 adjacent the outer side of one run of the chain 16 (preferably the upper run thereof). The plate 18a extends laterally beyond the inner side of the leg 11a and such extended portion is formed with an elongated slot in which an anchor is removably seated, the anchor having on its lower side a depending boss 18b which extends into and fits between the end bars of a chain link; the anchor in this arrangement provides a driving connection between the leg 11a and flexible member or chain 16. The anchor is secured in position to the plate by a key 20. The connection 19 consists of separate plates 19a, 19b, suitably fixed to the inner side of the leg 11a' of the load carrying member 11' above and below the planes of the respective chain runs. Each of the plates 19a, 19b, is similar in construction to the plate 18a, the extensions thereon extending laterally beyond the inner side of the leg 11a' and formed with slots 19a', 19b', respectively. Each slot 19a', 19b', is adapted to removably receive an anchor 21, the anchor having a boss 21a adapted to removably project into the adjacent link of the chain 16, so that when the anchor is seated in one of said slots 19a', 19b', the leg 11a' is connected to the chain. The anchor 21 is preferably similar in construction to the anchor for the connection 18, except that one end thereof is extended to provide a handle 21x. The anchor 21 is selectively seated in either of said slots 19a', 19b', whereby the chain and connections between the latter and the legs 11a, 11a', cooperate to move the load carrying members 11, 11', on the guides 12, 13, relatively toward or from each other or the members 11, 11', on the guides 12, 13, as a unit, as later set forth. The extension on each plate 19a, 19b, is formed with two through, parallelly related openings 19c disposed at right angles to the adjacent slot in the adjacent plate and the anchor 21 is formed with two through openings which, when the anchor is seated in either of said slots, register with the openings 19c in the extension of the adjacent plate, the openings 19c, and corresponding opening in the anchor, when in registry serving to accommodate a pair of pins 21c on a plate 21d to lock the anchor in position. The plate 21d is removably secured in position by a locking mechanism indicated as an entirety at 22.

Figure 6:
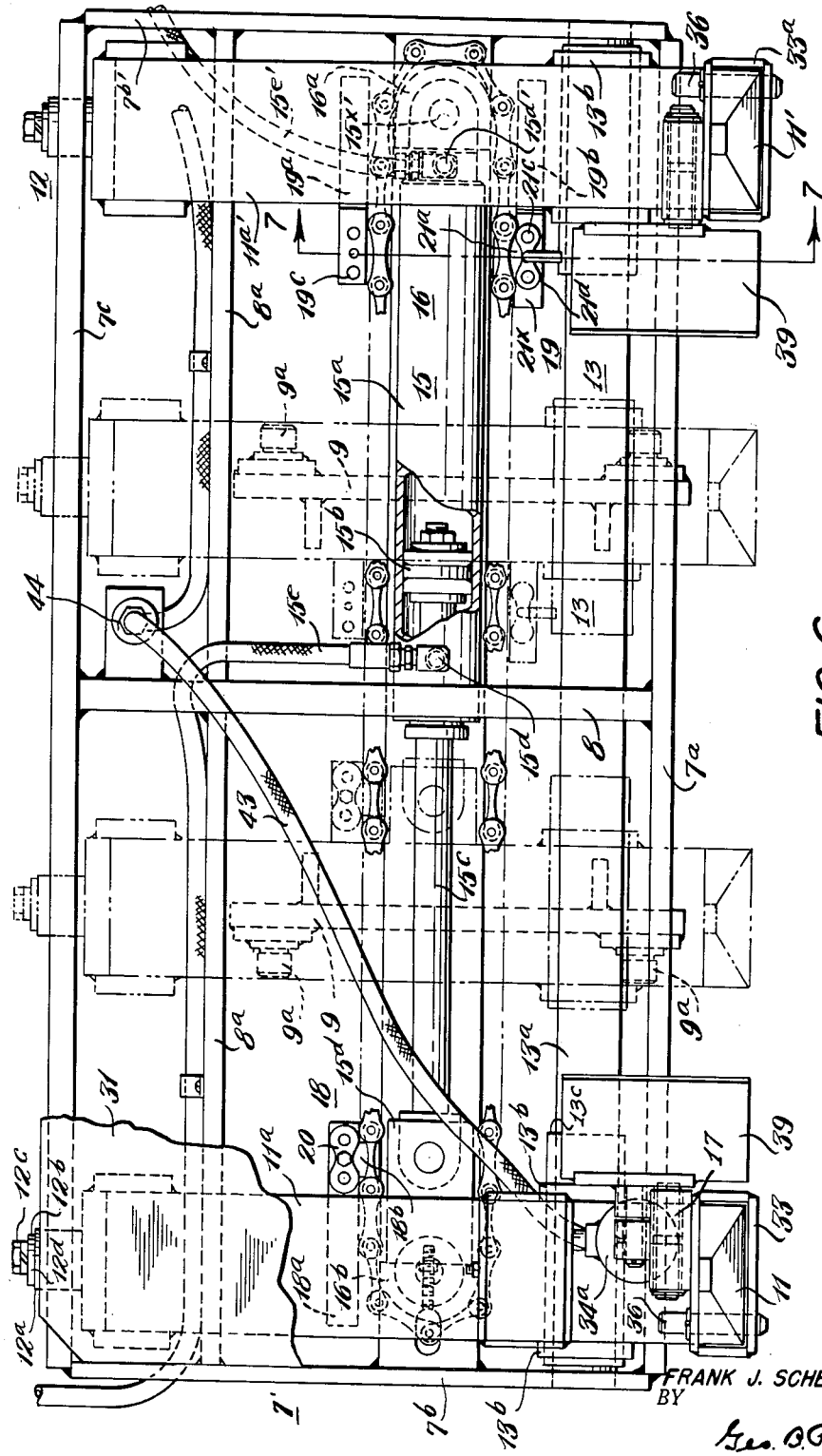
Fig. 6 is a fragmentary elevation looking toward the left of Figs. 1, 2 and 4, parts being broken away.
Figure 9:
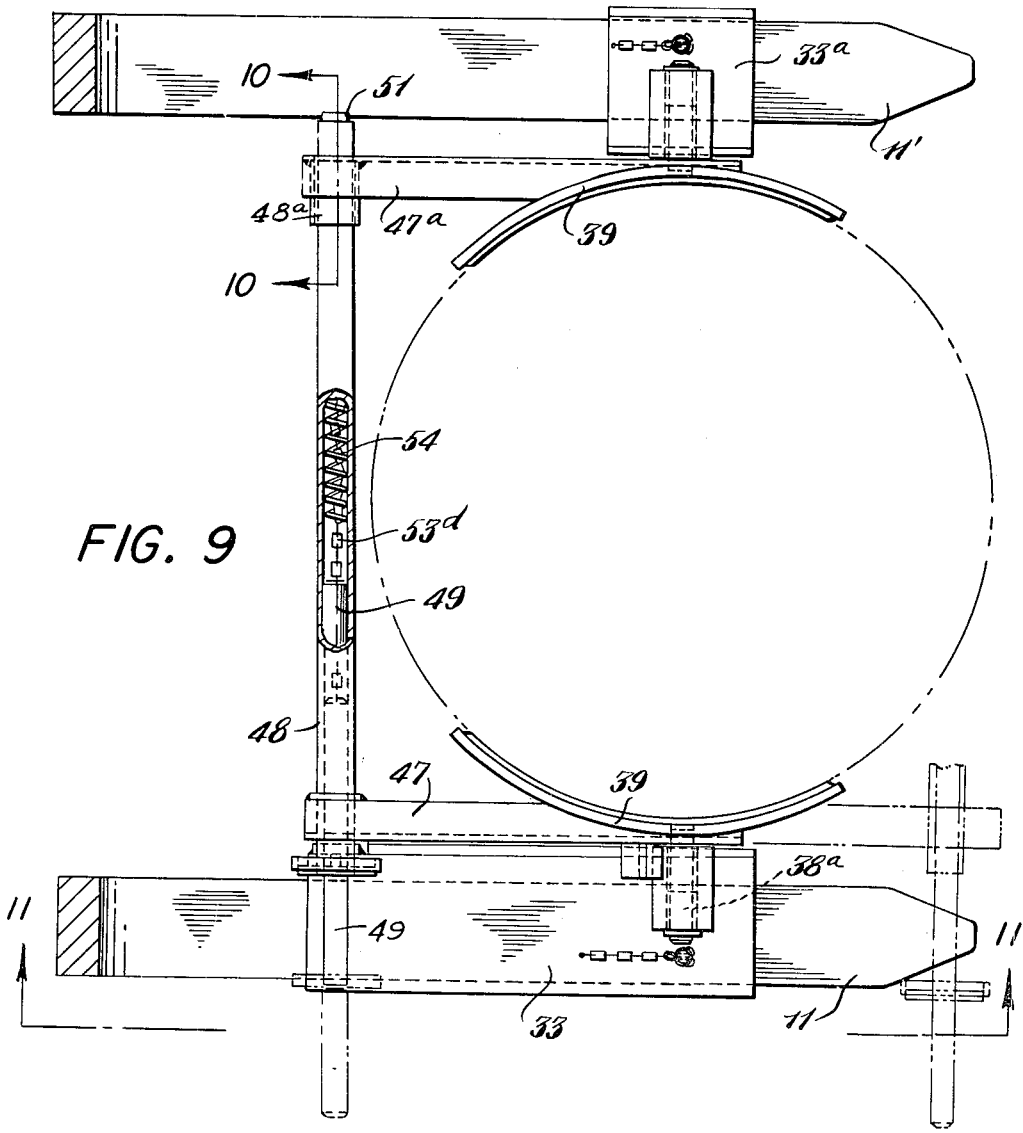
Fig. 9 is a plan view similar to Fig. 2 showing a modified form of construction, parts being broken away.
Figure 10:
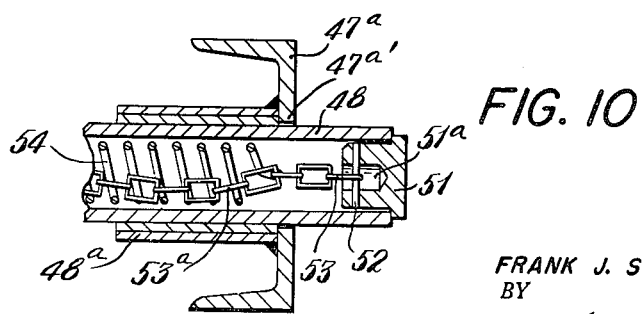
Fig. 10 is a fragmentary section on the line 10—10 of Fig. 9.
Figure 11:
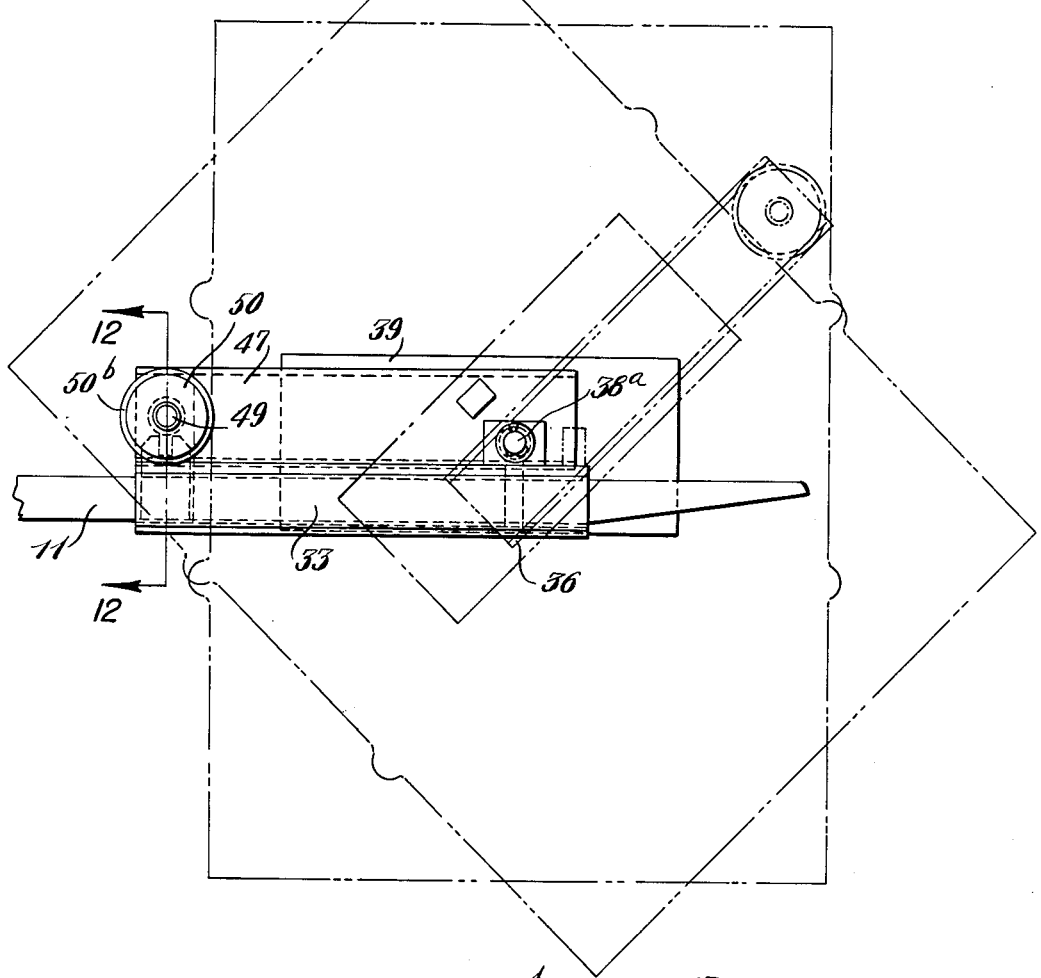
Fig. 11 is a side elevation of parts shown in Fig. 9.

*Operation.*—Referring to Fig. 6, it will be noted that the anchor 18b connects the leg 11a of the load carrying member 11 to a link on the upper run of the chain 16, whereas the anchor 21 connects the leg 11a' of the load carrying member 11' to the lower run of the chain 16. With the load carrying members 11, 11', disposed at their outer positions on the guides 12, 13, if fluid pressure is supplied to the inner end of the cylinder 15a to move the piston 15b toward the side bar 7b' (as viewed in Fig. 6), the piston will move the load carrying member 11 in the same direction and the latter through the chain 16 will move the load carrying member 11' in the opposite direction; that is, the power of the cylinder-piston unit transmitted to one of the load carrying members 11, 11', will effect a simultaneous movement of the latter toward each other, as shown in dotted lines in Fig. 6, and by reversal of the fluid pressure, supply connections to the cylinder 15a, the load carrying members 11, 11', may be simultaneously moved in the opposite direction. When the load carrying members 11, 11', are moved as above set forth they may be operated into pressure or clamping engagement with the opposite sides of steel drums, paper rolls, bales of cotton and the like and other types of loads as well as loads which are not supported on pallets, skids and like devices, and to raise and transport the loads and then discharge them in a rapid manner. Also, when the load carrying members 11, 11', are drivingly connected to the upper and lower runs of the chain 16, as above set forth, the load carrying members 11, 11', may be projected below a load to raise and transport it or for smaller loads the members 11, 11', may be moved toward each other into a selected spaced relation and then projected below the load to raise and transport it.

When it is desired to position the load carrying members 11, 11', for travel or movement as a unit, the anchor 21 is first removed from the slot 19b' to disconnect the load carrying member 11' from the chain 16, and next, fluid pressure is supplied to the cylinder 15a to move the load carrying member 11 relative to the load carrying member 11'. If the load carrying members 11, 11', are in the position shown in full lines in Fig. 6, the load carrying member 11 is moved toward the member 11'; on the other hand, if the load carrying members have been moved inwardly (for example, to the position shown in dotted lines in Fig. 6), and require to be spaced a greater distance, the member 11 is moved away from the member 11', the movement of the member being arrested when the desired spacing of the members is made, and thereafter the anchor 21 is seated in the slot 19a', to connect the boss 21b of the anchor 21 to a link of the upper run of the chain 16. In this latter position of the anchor 21, it will be observed that the fluid pressure supplied to the cylinder 15a will be effective to move the load carrying members 11, 11', as a unit in either direction, whereby side shifting of the loads for discharge in close relation to walls and other loads may be readily carried out. Where a pick-up of a load positioned close to a wall or another load takes place, the load carrying members may be moved or shifted to a position intermediate the side bars 7b, 7b', to locate the load in a stabilized position for transportation.

31 indicates a plate disposed on the outer sides of the legs 11a, 11r', and suitably removably secured thereto or top wall of the frame 7' to provide a guard for the parts mounted on the latter.

The mechanism above described forms the subject-matter of my co-pending application Serial No. 221,638, filed April 18, 1951, now Letters Patent No. 2,663,443, dated December 22, 1953, for which reason no claim thereto is made herein.

The load engaging means for engaging loads and supporting them consists of the power operated relatively movable forks 11, 11', including devices preferably complementary to the contour and/or nature of the load to be picked up and transported, such relationship between the load and the devices for engaging therewith being preferable to facilitate the operations and insure a positive grip with the load and to eliminate damage thereto; but it will be understood that the invention is not, in its broader scope, to be limited to the shape of the load engaging devices, except where such shape is specifically referred to.

Figure 1:
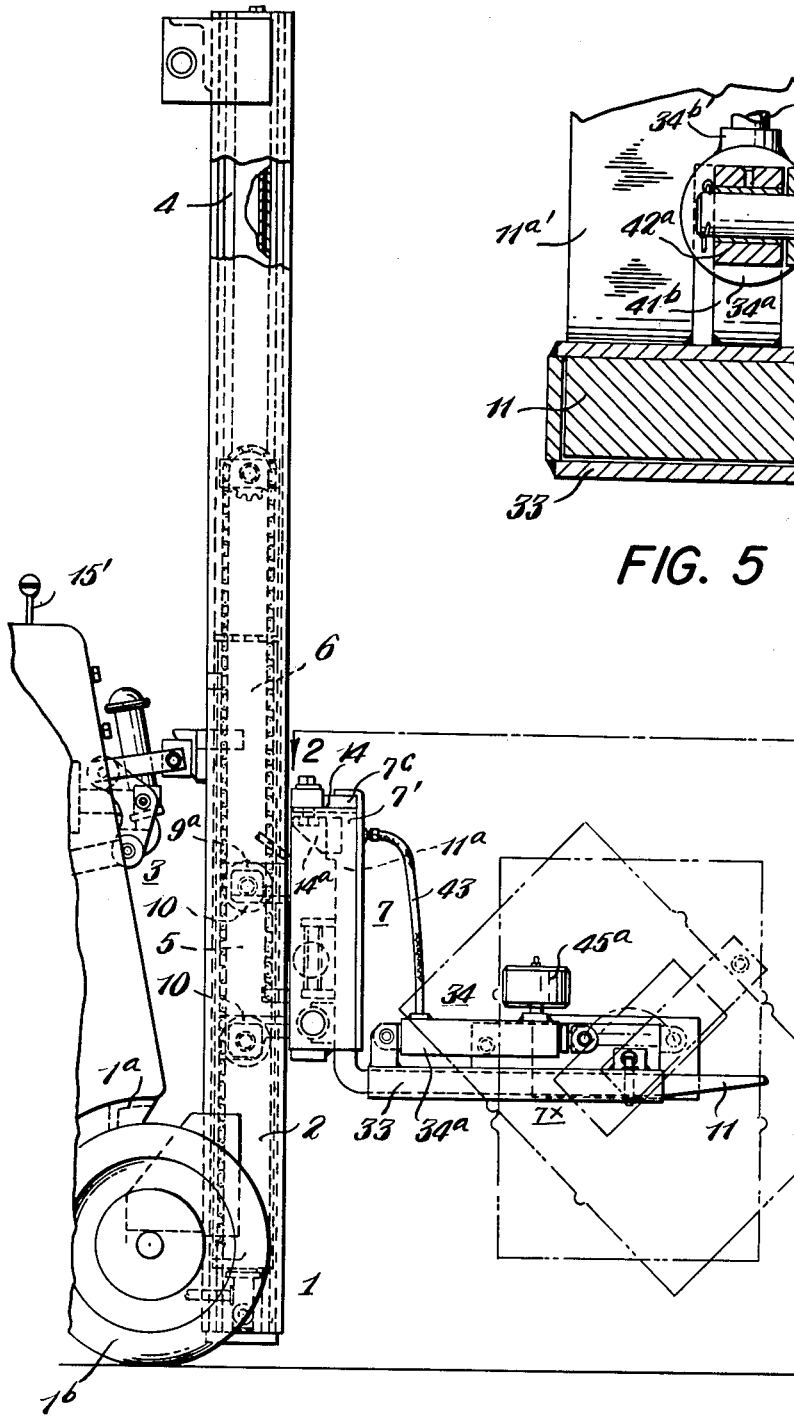

Referring to Figs. 1 to 8, inclusive, 32 indicates as an entirety the load engaging or supporting means shown for exemplification purposes engaging and supporting a cylindrically shaped body. This form is adapted to engage the outer sides of and transport rolls of paper stock, barrels, steel drums and the like. In the form of construction referred to the devices for engaging each body are trunnioned supported, whereby the latter may be tilted and swung into a position to permit (a) filling of the body where the latter is a container, removal of its contents or inverted, as shown in dotted lines (see Fig. 1), to effect discharge of the contents of the container by gravity, (b) inspection, (c) repair, (d) alteration or (e) assembly of parts on the body. The engaging means 32 comprise the following: 33, 33a, indicate a pair of supports, preferably hollow in cross section, the inner walls of which are substantially complementary to the cross sectional shape of the forks 11, 11', respectively, and adapted to be slid endwise on the latter and removably secured to the forks in alined relation. The support 33 is elongated to provide a support for a hydraulically operated mechanism 34 for a purpose later apparent. Each fork 11, 11', is formed with a vertically disposed opening 35 (the opening 35 preferably extends entirely through the adjacent fork—see Fig. 3), alined with the opening 35 in the other fork. The top and bottom walls of each support 33, 33a, are formed with alined openings 33b adapted to register with the opening 35 in the adjacent fork, whereby a removable pin 36 may be positioned in the openings 35, 33b, as shown, to lock the support to the adjacent fork. The upper end of the pin 36 is provided with a clip 36a arranged to serve as a shoulder or collar and limit the downward movement of the pin and as a connection for one end of a chain 36b, the opposite end of which is suitably anchored to the adjacent support, to prevent loss of the pin 36. Each support 33, 33a, is provided with a housing 37 axially related to the housing 37 on the other support. Each housing 37 is formed with a through opening provided with suitable bearings 38 (see Fig. 3) for a trunnion 38a. The outer end portion of each trunnion 38a is provided with a collar to prevent its endwise movement inwardly, whereas the inner end of the trunnion 38a is suitably fixed to a body engaging device 39. In the form of construction shown, the devices 39 are preferably elongated horizontally and of curvilinear shape about an imaginary vertical axis a, as viewed in Fig. 2, so as to be complementary to a cylindrical body such as already referred to. Since the devices 39 are mounted on the forks 11, 11', and the latter may be moved toward and from each other, it will be observed that the devices are operable to engage cylindrical bodies of different diameters, and the frame 7' and forks may be raised and lowered, as already set forth. It will also be observed that the devices 39 may be positioned to engage each body in the plane of or slightly above its center gravity, whereby tilting of the body on the trunnions for inspection of its interior, supplying material into it or to an inverted inclined position, as shown in dotted lines in Fig. 1, is facilitated. As the axes of the trunnions are disposed transversely to the guides 2, 4, the body which is supported on the devices 39 swings in a plane extending longitudinally of the truck frame.

As shown in Fig. 2, the devices 39 are connected to the trunnion 38a at a point nearer their front ends than their rear ends, for the following reasons: (a) the travel of the forks away from each other to admit the body A between the devices 39 and then into engagement with the body is reduced and (b) the rear portions of the devices 39 extend inwardly beyond their front ends and therefore in picking up a body these rear end portions will form a stop and serve as a signal to the operator to stop the truck travel.

The body engaging devices 39 are connected together so that in the application of manual power (as later set forth) or by the fluid operated mechanism 34, both devices 39 will swing as a unit. The connections between the devices 39 consist of the following: 40, 40a, indicate arms suitably fixed at their inner ends to the outer faces of the devices 39, and extend tangentially rearwardly therefrom. The arms 40, 40a, are preferably channel shape in cross section. The outer end of the arm 40 is suitably rigidly connected to the adjacent end of a cross member (preferably a tube) 40x disposed parallel to the axis of the trunnions 38a and extending through a collar 40b fixed to the arm 40a and an opening in the latter in registry with the collar (see Fig. 2a), into overlapping relation to the fork 11'. As shown, the body engaging devices 39 and arms 40, 40a, are normally held in a horizontal position by the piston rod 34c' of the hydraulically operated mechanism 34 when the piston is in its retracted position, as shown in Figs. 1, 2 and 4.

Each body or load engaging member 39 may consist of a back 39a and an outer layer of suitable friction material 39b, preferably a layer of rubber or rubber compound, which has a yieldable characteristic to permit engagement with the opposite sides of a body A or load under yieldable frictional pressure.

In the form of construction being referred to, the hydraulic mechanism 34 consists of the following: 34a indicates a cylinder having fluid connections 34b, 34b', at its opposite ends and a reciprocable piston 34c, within the cylinder, connected to the inner end of a piston rod 34c'. The inner end of the cylinder 34a is provided with an end wall 41 having an extension 41a suitably pivotally mounted on a standard 41b (which is suitably fixed to the inner end portion of the support 33), the opposite end of the cylinder 34a being provided with a suitable gland 42. The outer end of the piston rod 34c' is removably connected to a hollow boss 42a in which is mounted one end of a wrist pin 42b. The opposite end of the wrist pin 42b is rigidly secured to the adjacent end portion of the arm 40 in a plane above the adjacent trunnion 38a, such connection of the piston rod 34c' with the arm 40 serving to support the outer end of the cylinder 34a and as a crank to swing the body engaging devices 39 on the trunnions 38a to selected positions, for example to the position shown in dotted lines in Fig. 1. The fluid connection 34b is connected to a fluid conduit 43 (preferably consisting of a hose) leading to a valve having connection with a source of fluid under pressure supply (not shown), which valve, in one operated position, supplies the fluid to the adjacent end of the cylinder 34a, to operate the piston 34c outwardly and its other operated position to permit flow of the fluid in the cylinder to a sump forming part of the source of fluid supply, in the return movement of the piston. The conduit 43 is formed in sections, the adjacent ends of which are connected to a coupling 44 (see Figs. 2 and 2b) having male-and-female parts 44a, 44b, and spring controlled valve elements 44a', 44b', respectively, arranged to automatically close when the parts are detached. The coupling 44 is of standard construction, for which reason it is not described in more detail. The coupling 44 is suitably mounted on the frame 7'.

The fluid connection 34b' is connected to a nipple 45 which in turn is connected to and supports an air compression chamber 45a into which the fluid in the cylinder 34a on the forward side of the piston 34c is forced by the outward stroke of the latter, the fluid supplied to the chamber 45a serving to compress the air therein, so that when the valve in the conduit 43 is operated to the position to permit the piston 34c to move rearwardly, the air pressure in the chamber 45a will operate the piston to its first position (as shown in Fig. 4) and force the fluid in the cylinder on the rear side of the piston through conduit 43 and control valve to the sump. The quantity of fluid forced into the chamber 45a will depend on the length of stroke of the piston 34c, one level of the liquid in the chamber is shown at b. The chamber 45a may be initially supplied with air under a predetermined pressure, so that such pressure plus the increase thereof resulting from the fluid forced into the chamber by the outward stroke of the piston, will be effective to quickly move the piston rearwardly. Such increased pressure will be especially advantageous where the conduit 43 is of undue length. The chamber 45a may be charged with air under pressure through a valve controlled inlet 45b, which may be similar in construction to the valve for the inner tube of a tire.

When found desirable, the fluid connection 34b' may be connected to a conduit 43x, as shown in Fig. 13, whereby the supplied fluid under pressure operates the piston 34c rearwardly as well as outwardly. In this form of construction the valve controls the supply of fluid pressure to either end of the cylinder 34a and discharge of the fluid from its opposite end for flow through the valve to the sump. The valve being of standard construction it is not illustrated.

Figure 12:
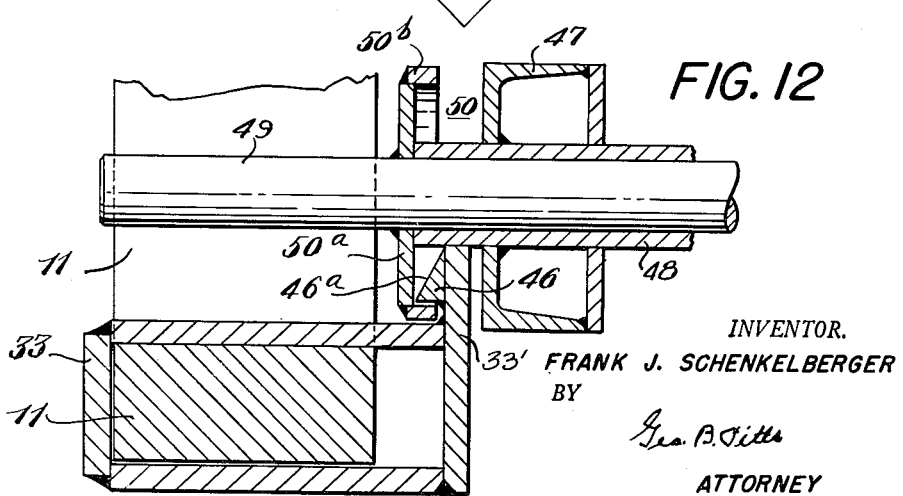
Fig. 12 is a section on the line 12—12 of Fig. 11, enlarged.
Figure 16:
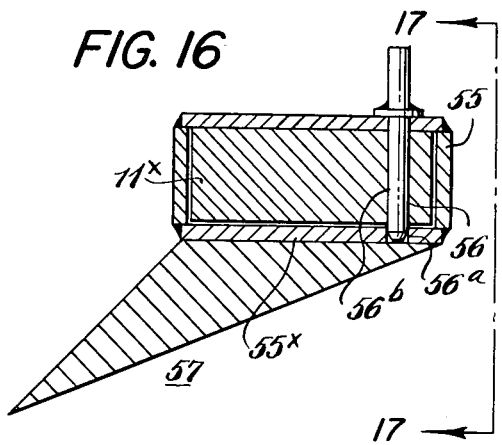
Fig. 16 is a section (enlarged) on the line 16—16 of Fig. 14.
Figure 17:
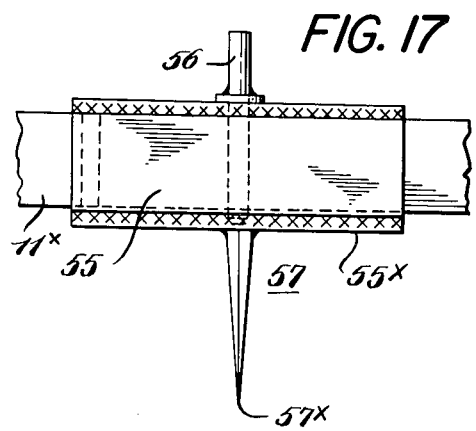
Fig. 17 is a fragmentary elevation on the line 17—17 of Fig. 16.
Figure 14:
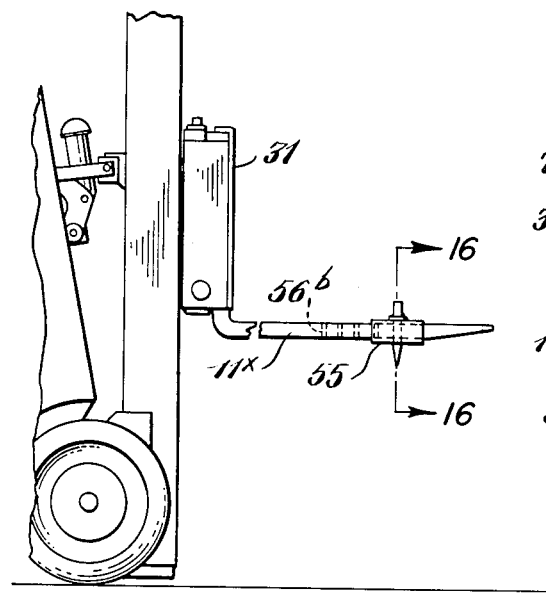
Fig. 14 is a fragmentary side elevation showing another modification.

Figs. 9, 10, 11 and 12 show a different modification wherein the load engaging devices 39 are operated manually about the axis of the trunnions 38a. Referring to these views, the supports 33, 33a, are mounted on the forks 11, 11', and removably secured thereto by pins 36 as already described. The supports 33, 33a, are similar to the supports shown in Figs. 1, 2 and 3 except that the top and bottom walls of the support 33 are extended inwardly to support the inner side wall 33' thereof in spaced relation to the fork 11 (for a purpose later apparent), which side wall extends upwardly and is provided on its inner face with a catch 46 later referred to (see Fig. 12). Also, the body or load engaging devices 39 are connected to arms 47, 47a, preferably of channel shape in cross section, which extend rearwardly and are connected together by a tubular cross member 48. As shown in Fig. 12, the end portion of the cross member 48 adjacent the support 33 extends through and is rigidly connected to the arm 47, whereas its opposite end portion extends through a sleeve 48a suitably fixed to the arm 47a and an opening 47a' formed in the arm 47c in registry with the sleeve 48a. The cross member 48 is provided with a handle 49 the inner portion of which is mounted in and endwise slidable in the cross member 48, whereby a device 50 suitably fixed to the handle may be engaged with and disengaged from the catch 46. The handle 49 extends outwardly beyond the arm 47, whereby it may be readily gripped and operated endwise outwardly to effect disengagement of the device 50 from the catch 46 and thereafter moved upwardly to rock the body engaging devices 39. The locking device 50 consists of a disk 50a provided with a rim 50b adapted to engage the bottom wall of the catch 46 and thus prevent upward movement of the handle 49 and arms 47, 47a. The disk 50a is arranged to engage the adjacent end of the cross member 48 to limit the inward movement of the handle 49. The handle 49 is normally biased inwardly by a spring to yieldably maintain the disk 50a in engagement with cross member 48 and limited in its outward movement against the tension of the spring by the following instrumentalities; 51 indicates an anchor suitably mounted in the end of the cross member 48 adjacent the arm 47a (see Fig. 10). The inner end of the anchor 51 is formed with a recess 51a which is bridged by a rod 52. The rod 52 is engaged by a link or hook 53 on the adjacent end of a flexible member, such as a chain 53a; the opposite end of the chain 53a is suitably connected to the inner end of the handle 49. The chain 53a is longer than the distance from the anchor 51 to the inner end of the handle 49 when the latter is positioned inwardly with the disk 50a in engagement with the cross member 48, so that when the handle 49 is initially pulled outwardly the chain 53a limits such movement, prevents displacement of the handle and enables the latter to swing the load engaging devices to selected positions. 54 indicates a coiled spring mounted endwise in the cross member 48. The opposite ends of the spring 54 are connected to two links of the chain 53a spaced from each other a distance greater than the length of the spring 54 when it is under slight or initial tension sufficient to hold the handle 49 in inoperative position, that is, with the disk 50a in engagement with the cross member 48 and locked against upward movement. However, when the handle 49 is pulled outwardly, the tension of the spring 54 is increased and made effective and, upon release of the handle, to automatically return it to its inoperative position.

It will be observed that the catch 46 is provided with an inclined wall 46a disposed in the path of movement of the disk rim 50b when the handle 49 is moved downwardly. While the handle 49 may be held in extended position and moved downwardly to a position where, upon release thereof, the rim 50b will engage the catch 46, it will be observed that if the release of the handle 49 takes place while the load engaging devices 39 are in an operated position and the weight of the handle 49, cross member 48 and arms 47, 49a, and/or load is sufficient to return the arms 47, 47a, to normal position, the rim 50b will ride the cam wall 46a against the tension of the spring 54 and automatically engage the catch 46 with disk 50a in engagement with the cross member 48.

Figure 15:
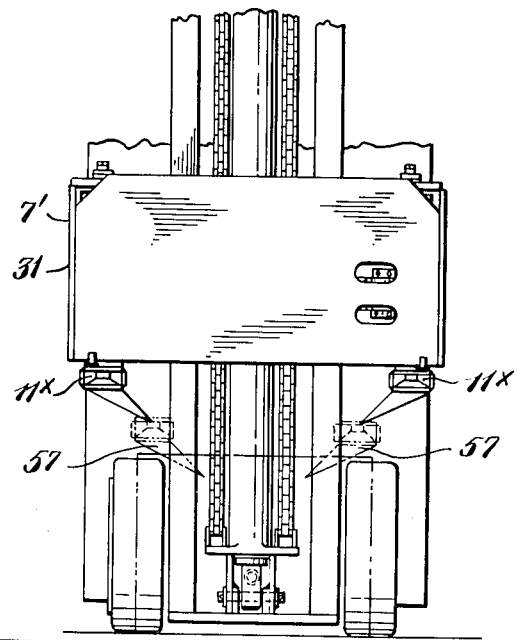
Fig. 15 is a front elevation of parts shown in Fig. 14.

Figs. 14, 15, 16 and 17 illustrate another modified form of construction wherein the relatively movable forks 11, 11', are provided with removable load engaging devices of a type capable of penetrating the material of which the load is formed as well as applying pressure thereto whereby the load may be raised and transported, and by a movement of the forks 11, 11', away from each other the devices may be disengaged from the load. As will later be apparent the load engaging devices are adapted to engage and transport rolls of rope, bales of hemp and cotton and the like, as well as bales of scrap cellulose stock and other scrap material, crude rubber and other compressible material. Referring to these views, the truck, raisable support, the frame 7x, forks 11x, 11x, and the mechanism for raising the support and the mechanism for operating the forks simultaneously toward or from each other, are similar in construction and operation to corresponding parts, respectively, as already described. 55 indicates a support telescopically mounted on each fork 11x and removably connected thereto by a pin 56 extending through alined or registering openings 56a preferably formed in the top and bottom walls of the support 55 and an opening 56b formed in the adjacent fork 11x and alined with the opening 56b in the other fork. By forming in each fork 11x with a plurality of alined openings 56b, the supports 55 may be adjusted endwise thereof to position the load engaging devices in or substantially in a plane cutting the center of gravity of the load. 57 indicates a load engaging device rigidly connected to the bottom wall 55x of each support 55 and extending downwardly and inwardly therefrom to co-operate with the other device 57, as shown in Fig. 15. As shown, the side walls of each device 57 are disposed in converging relation and terminate in a relatively sharp end or point 57x to facilitate the penetration of the device into the material when the forks 11x are moved toward each other. As the devices 57 extend inwardly and the side walls of each device are inclined outwardly from the point 57x, they penetrate into and engage with and serve to compress a large area of the material to insure a lifting operation of the load. As shown in dotted lines in Fig. 15, the devices 57 may be simultaneously moved inwardly and downwardly to obtain an adequate lifting engagement with the load, dependent on its weight and/or kinds of material forming the load.

Figs. 18 and 19 illustrate a further modified form of construction wherein the load engaging devices 39x are shaped to engage the opposite internal sides or opposite external sides of a hollow or cylindrical body. In these views, 7' indicates the frame which is secured to the raisable support or elevating member. 11, 11', indicate the forks connected at their inner ends to upstanding legs 11a, 11a', which in turn are slidably mounted for relative movement toward and from each other by the devices 12, 13, mounted on the legs 11a, 11a', and frame 7', respectively, as already described. The members 11, 11', may extend outwardly from the frame 7' any desired distance. 58, 58', indicate separate supports mounted on the forks 11, 11', respectively. Each separate support 58 is shaped to removably fit the walls of the forks and be secured to either one in any preferred manner. For illustrative purposes, each separate support consists of a top, sides and a bottom the inner walls of which are complementary to the corresponding walls of the adjacent fork (see Fig. 19). Each separate support 58 is secured to the adjacent fork by a pin 59 which removably extends through alined openings 58a formed in the top and bottom of the separate support and a through opening 60 formed in the adjacent fork. By forming in each fork a plurality of alined openings 60, the separate supports 58 may be adjusted endwise thereof. Each pin 59 is connected to the adjacent separate support 58 by a chain, as already set forth.

The load engaging devices 39x are elongated in a direction parallel to the forks 11, 11', and of arcuate shape from end to end, each preferably being symmetrical to the openings 58a in the adjacent separate support 58. The upper end of each load engaging device 39x is welded to the bottom of the adjacent separate support 58 and depends therefrom. In this form of load engaging device, the faces 39x' may be utilized to diametrically engage outer surfaces of a load, whereas the faces 39x'' may be utilized to diametrically engage the inner surface of a load where it consists of a container. By preference, the faces 39x', 39x'', of each device 39x are provided with a layer 39z formed of compressible material, such as rubber or rubber compound, as hereinbefore set forth.

It will be observed that the load engaging members 39x depend downwardly from the separate supports and are therefore disposed in a plane below that of the forks. In operation, the elevating member is first raised to position the forks and load engaging devices 39x at a level above the upper end of the body to be engaged and raised, so that upon driving of the truck forwardly the load engaging devices clear the body; either before or after the truck is driven forwardly, as just set forth, the forks 11, 11', are relatively moved in directions to initially position the load engaging devices 39x in vertical planes spaced from those walls of the body to be engaged thereby; next, the elevating member is lowered to position the load engaging devices 39x below the upper end of the body. If the outer sides of the body are to be engaged by the devices 39x, the forks 11, 11', are initially spaced so that the faces 39x' are in opposed relation to the outer sides of the body; whereas, if the inner sides of the body are to be engaged by the devices 39x the forks 11, 11', are initially spaced so that the faces 39x" are in opposed relation to the inner sides of the body; and finally, the forks 11, 11', are relatively moved to effect engagement of the devices 39x with the opposite sides of the body, whereby the latter may be raised and transported.

To those skilled in the art to which my invention relates many changes in construction and widely differing embodiments and applications of the invention will suggest themselves without departing from the spirit and scope of the invention. My disclosure and the description herein are purely illustrative and are not intended to be in any sense limiting.

What I claim is:

1. A truck having, in combination, upwardly extending guides on the truck frame, a support mounted on said guides for movement upwardly and downwardly thereon, means for moving said support upwardly, a pair of outwardly extending load supporting members mounted on said support for relative movement laterally toward and away from each other, a separate member removably mounted on each of said load supporting members, a load engaging device on each of said separate members and aligned with and extending toward the load engaging device on the other separate member, first and second means respectively trunnioning said devices on their respective separate members for rotation about axes disposed at right angles to the supporting members, said first and second means being removable with their respective separate member, connecting means interconnecting said devices for movement as a unit, and operating means supported entirely on one of said separate members and operatively connected to the device supported by the respective member for swinging said devices about their axes.

2. A truck having, in combination, upwardly extending guides on the truck frame, a support mounted on said guides for movement upwardly and downwardly thereon, means for moving said support upwardly, a pair of outwardly extending load supporting members mounted on said support for relative movement laterally toward and away from each other, a separate member removably mounted on each of said load supporting members, a load engaging device on each of said separate members and aligned with and extending toward the load engaging device on the other separate member, first and second means respectively trunnioning said devices on their respective separate members for rotation about axes disposed at right angles to the supporting members, said first and second means being removable with their respective separate member, connecting means interconnecting said devices for movement as a unit, power means supported solely on one of said separate members and operatively connected to the device on the member for rotating the device, means interconnecting said devices for rotation as a unit, a source of power mounted on the truck frame, and means providing readily detachable connections for interconnecting the source of power and said power means.

3. A truck having, in combination, upwardly extending guides on the truck frame, a support mounted on said guides for movement upwardly and downwardly thereon, means for moving said support upwardly, a pair of outwardly extending load supporting members mounted on said support for relative movement laterally toward and away from each other, a separate member removably mounted on each of said load supporting members, a load engaging device on each of said separate members and aligned with and extending toward the load engaging device on the other separate member, said devices being trunnioned on their respective separate members for rotation about axes disposed at right angles to the supporting members, connecting means interconnecting said devices for movement as a unit, power means supported solely on one of said separate members, a source of power mounted on the truck frame, and means providing readily detachable connections for interconnecting the source of power and said power means, said power means comprising fluid operated cylinder dash piston elements one of which is connected to the adjacent load engaging device.

4. A truck having, in combination, upwardly extending guides on the truck frame, a support mounted on said guides for movement endwise thereof, means for moving said support upwardly, a pair of supporting members mounted at their inner ends on said support, at least one of said members being movable laterally towards and from the other member, means for moving said movable supporting member laterally, load engaging elements trunnioned on said supporting members in aligned relation and adapted to engage and disengage the diametrically opposite sides of a load, means for connecting said load engaging members together for movement about said trunnions, fluid operated means comprising cooperating cylinder-piston elements mounted on one of said supporting members and connected to the adjacent load engaging element for swinging said elements about said trunnions, an air compression chamber to which one end of said cylinder element is connected, a conduit leading from a valve controlled source of fluid under pressure supply and discharge system connected to the opposite end of said cylinder element, the supply of fluid pressure to the opposite end of said cylinder element being arranged to relatively move the piston element away from said opposite end of said cylinder element and to force the fluid in said cylinder element into said chamber and compress the air therein, whereby upon cutoff of the fluid pressure supply the compressed air in said chamber is adapted to reverse the movement of said piston element toward the opposite end of said cylinder element and discharge the fluid in the latter through said conduit.

5. A truck having, in combination, upwardly extending guides on the truck frame, a support mounted on said guides for movement upwardly and downwardly thereon, means for moving said support upwardly, a pair of outwardly extending load supporting members mounted on said support for relative movement laterally, a separate member removably mounted on each of said load supporting members, a load engaging device on each of said separate members and aligned with and extending toward the load engaging device on the other separate member, first and second means respectively trunnioning said devices on their respective separate members for rotation about axes disposed at right angles to the supporting members, said first and second means being removable with the respective separate member, connecting means interconnecting said devices for movement as a unit, and a handle movably supported on said connecting means, and latch devices for latchingly engaging said handle and one of said separate members.

6. In a handling mechanism adapted to be removably secured to load supporting forks mounted for relatively lateral movement toward or from each other on the elevating member of a truck, supporting members each adapted to be detachably mounted on one of the forks on said elevating member, a device mounted on each of said supporting members in alignment with the device on the other supporting member, said devices being adapted to extend toward each other and being arranged to engage the opposite sides of a load upon movement of said forks toward each other whereby the load may be raised by the elevating member, means fulcruming said devices on their respective separate members for swinging movement about axes extending transversely of said supporting members, connecting means interconnecting said devices for movement on their fulcrums as a unit, fluid operated mechanism mounted on one of said supporting members and connected to the adjacent device for swinging said devices about their fulcrums.

7. A truck having, in combination, upwardly extending guides on the truck frame, a support mounted on said guides for movement upwardly and downwardly thereon, means for moving said support upwardly, a pair of outwardly extending load supporting members mounted on said support for relative movement laterally, a separate member mounted on each of said load supporting members, a load engaging device on each of said separate members alined with the device on the other separate member, each of said devices extending downwardly and inwardly towards the other and having outwardly tapering side walls terminating in a pointed end and arranged to be projected into the material forming the load to be raised, and means for operating said members toward and from each other.

8. A truck having, in combination, upwardly extending guides on the track frame, a support mounted on said guides for movement upwardly and downwardly thereon, means for moving said support upwardly, a pair of outwardly extending load supporting members mounted on said support for relatively movement laterally toward and away from each other, a separate member removably mounted on each of said load supporting members, a load engaging device on each of said separate members and aligned with and extending toward the load engaging device on the other separate member, first and second means respectively trunnioning said devices on their respective separate members for rotation about axes disposed at right angles to the supporting members, said first and second means being removable with their respective separate member, connecting means interconnecting said devices for movement as a unit, power means supported solely on one of said separate members, a source of valve controlled fluid under pressure supply and discharge system on the truck frame, and means providing readily detachable connections for interconnecting the source of fluid pressure and said power means, said power means comprising fluid operated cylinder-piston elements one of which is connected to the adjacent device, and said detachable connections comprising conduits leading from said source of valve controlled fluid under pressure supply and discharge system and connected to the opposite ends of said cylinder element and adapted to supply fluid pressure to either end of said cylinder element and discharge of fluid from its opposite end for operating said piston element in either direction.

9. In an industrial truck, an elevatable member, first and second load supporting members extending outwardly from said elevatable member, means connecting the inner ends of said load supporting members to said elevatable member for relative movement toward and away from each other, first and second separate members detachably connected to said first and second load supporting members respectively, first and second load engaging devices supported on said first and second separate members respectively for movement with respect thereto, means for moving one of said devices, and motion-transmitting means interconnecting said devices for causing said devices to move as a unit when said one device is actuated with respect to its respective separate member and permitting relative movement of said load supporting members toward and away from each other.

10. In a load handling mechanism adapted to be removably secured to load supporting forks mounted for relatively lateral movement toward or away from each other on the elevating member of a truck, first and second members each adapted to be detachably mounted on one of the forks of said elevating member, first and second load engaging devices, means supporting said first and second devices on said first and second members respectively for rotation about aligned axes transverse to said forks, and means interconnecting said devices for causing said devices to move as a unit when rotated and permitting said devices to move toward and away from each other upon relative lateral movement of the forks on said elevating member.

11. In an industrial truck, an elevatable member, first and second load supporting members extending outwardly from said elevatable member, means connecting the inner ends of said load supporting members to said elevatable member for relative movement toward and away from each other, first and second load engaging devices, means supporting said first and second devices on said first and second load supporting members respectively for rotation with respect thereto, means for rotating one of said devices, and motion-transmitting means interconnecting said devices for causing said devices to rotate as a unit when said one device is actuated with respect to its respective load supporting member and permitting relative movement of said load supporting members toward and away from each other.

12. In a load handling mechanism adapted to be removably secured to load supporting forks mounted for relatively lateral movement toward or away from each other on the elevating member of a truck, first and second members each adapted to be detachably mounted on one of the forks of the elevating member, first and second load engaging devices depending from said first and second members respectively, each of said load engaging devices having a curved cross-section for engaging the side wall of a cylindrical object positioned between the devices, said devices being adapted to engage both the internal side wall and the external side wall of a cylindrical tubular member.

13. In an industrial lift truck, an elevatable member, a load supporting member extending outwardly from said elevatable member, a load engaging device, means mounting said load engaging device on said load supporting member for movement relative thereto in opposite directions, power actuated means for selectively moving said device in said directions comprising a fluid pressure cylinder and cooperating piston, means for supplying fluid pressure to said cylinder on one side of said piston to relatively move said piston and cylinder in one direction, an air reservoir communicating with said cylinder on the other side of said piston, and pressure fluid in said cylinder on said other side of said piston, said pressure fluid on said other side of said piston being compressed into said reservoir upon application of fluid pressure to said one side to relatively move said piston and cylinder in one direction and expanding upon the connection of said one side of said piston to exhaust to relatively move said piston and said cylinder in the other direction.

References Cited in the file of this patent

UNITED STATES PATENTS

| | | |
|---|---|---|
| 1,491,384 | Eidmann | Apr. 22, 1924 |
| 2,362,991 | Dahl | Nov. 21, 1944 |
| 2,390,293 | Colson | Dec. 4, 1945 |
| 2,479,623 | Johnson | Aug. 23, 1949 |
| 2,482,692 | Quales et al. | Sept. 20, 1949 |

(Other references on following page)

UNITED STATES PATENTS

| | | |
|---|---|---|
| 2,483,745 | Vossenberg | Oct. 4, 1949 |
| 2,517,938 | Stevenson | Aug. 8, 1950 |
| 2,536,151 | Backofen et al. | Jan. 2, 1951 |
| 2,547,329 | Lapham | Apr. 3, 1951 |
| 2,550,219 | Bollinger | Apr. 24, 1951 |
| 2,571,550 | Ehmann | Oct. 16, 1951 |
| 2,601,933 | Seagraves et al. | July 1, 1952 |
| 2,611,498 | Broersma | Sept. 23, 1952 |
| 2,620,930 | Mullgardt | Dec. 9, 1952 |
| 2,645,372 | Broersma | July 14, 1953 |
| 2,647,650 | Sherriff | Aug. 4, 1953 |
| 2,690,271 | Marietta | Sept. 28, 1954 |

FOREIGN PATENTS

| | | |
|---|---|---|
| 112,788 | Australia | Mar. 21, 1941 |